(12) United States Patent
Chen

(10) Patent No.: US 8,958,836 B2
(45) Date of Patent: Feb. 17, 2015

(54) SYSTEM AND METHOD FOR IMPLEMENTING COORDINATED RESOURCE ALLOCATIONS

(75) Inventor: Wei-Peng Chen, Fremont, CA (US)

(73) Assignee: Fujitsu Limited, Kawasaki-shi (JP)

( * ) Notice: Subject to any disclaimer, the term of this patent is extended or adjusted under 35 U.S.C. 154(b) by 421 days.

(21) Appl. No.: 13/173,336

(22) Filed: Jun. 30, 2011

(65) Prior Publication Data

US 2013/0005375 A1 Jan. 3, 2013

(51) Int. Cl.
*H04W 72/04* (2009.01)
*H04W 72/08* (2009.01)
*H04W 52/34* (2009.01)
*H04W 52/24* (2009.01)
*H04W 88/08* (2009.01)
*H04B 7/02* (2006.01)

(52) U.S. Cl.
CPC .......... *H04W 72/082* (2013.01); *H04W 52/346* (2013.01); *H04W 52/243* (2013.01); *H04W 72/0426* (2013.01); *H04W 88/085* (2013.01); *H04B 7/024* (2013.01)
USPC ............................ 455/509; 455/450; 455/464

(58) Field of Classification Search
CPC .............................. H04W 84/08; H04W 28/04
USPC ........................................................ 455/509
See application file for complete search history.

(56) References Cited

U.S. PATENT DOCUMENTS

| | | | |
|---|---|---|---|
| 6,504,829 B1 * | 1/2003 | Young et al. .................. | 370/337 |
| 6,788,702 B1 * | 9/2004 | Garcia-Luna-Aceves et al. ............................. | 370/458 |
| 6,885,651 B1 * | 4/2005 | Young ............................ | 370/337 |
| 6,967,944 B2 * | 11/2005 | Choi .............................. | 370/348 |
| 7,308,268 B2 * | 12/2007 | Barbosa da Torre et al. . | 455/446 |
| 7,440,437 B2 * | 10/2008 | Song .............................. | 370/343 |
| 7,570,615 B2 | 8/2009 | Bolin et al. | |

(Continued)

FOREIGN PATENT DOCUMENTS

GB 2 444 996 A 6/2008 ............... H04Q 7/38

OTHER PUBLICATIONS

Notification of Transmittal of the International Search Report and the Written Opinion of the International Searching Authority, or the Declaration; International Application No. PCT/US2012/041299, Date of mailing Sep. 24, 2012.

(Continued)

*Primary Examiner* — Hai V Nguyen
(74) *Attorney, Agent, or Firm* — Baker Botts L.L.P.

(57) ABSTRACT

A method for implementing coordinated resource allocations includes establishing one or more wireless connections using a first channel with one or more endpoints via at least one remote transceiver. The method further includes determining a schedule that assigns a first number of resource blocks to each endpoint of the one or more endpoints. The method additionally includes receiving one or more neighboring transceiver schedules determined by one or more neighboring base stations. Each neighboring transceiver schedule indicating a different number of resource blocks assigned to each neighboring remote transceiver connected to the respective neighboring base station. The method also includes determining one or more time slots and subcarriers within the first channel to assign to each resource block for each endpoint of the one or more endpoints based on the schedule and the neighboring transceiver schedules. The method further includes determining a power distribution for each resource block for each endpoint.

21 Claims, 4 Drawing Sheets

(56) References Cited

U.S. PATENT DOCUMENTS

| | | | |
|---|---|---|---|
| 7,715,466 B1 | 5/2010 | Oh et al. | 375/211 |
| 7,773,947 B2* | 8/2010 | Gerlach | 455/63.1 |
| 7,830,907 B1* | 11/2010 | Petranovich et al. | 370/436 |
| 8,009,623 B2* | 8/2011 | Higuchi et al. | 370/329 |
| 8,023,524 B2 | 9/2011 | Doppler et al. | |
| 8,023,956 B2* | 9/2011 | Hu | 455/452.1 |
| 8,023,989 B2* | 9/2011 | Chang et al. | 455/522 |
| 8,041,362 B2* | 10/2011 | Li et al. | 455/452.1 |
| 8,175,044 B2* | 5/2012 | Seki et al. | 370/329 |
| 8,270,504 B2* | 9/2012 | Choi et al. | 375/260 |
| 8,326,310 B2* | 12/2012 | Hu | 455/452.1 |
| 8,355,385 B2* | 1/2013 | Kim et al. | 370/332 |
| 8,379,574 B2* | 2/2013 | Hilborn | 370/328 |
| 8,452,305 B2* | 5/2013 | Brisebois et al. | 455/456.1 |
| 8,509,064 B2* | 8/2013 | Rhee et al. | 370/229 |
| 8,537,760 B2* | 9/2013 | Tee et al. | 370/329 |
| 8,682,313 B2* | 3/2014 | Kim et al. | 455/422.1 |
| 8,724,492 B2* | 5/2014 | Frank et al. | 370/252 |
| 8,724,557 B2* | 5/2014 | Shin et al. | 370/329 |
| 8,744,472 B2* | 6/2014 | Berberana | 455/452.2 |
| 8,804,586 B2* | 8/2014 | Fong et al. | 370/311 |
| 8,824,383 B2* | 9/2014 | Lindoff et al. | 370/329 |
| 8,830,863 B2* | 9/2014 | Novak et al. | 370/252 |
| 8,842,565 B2* | 9/2014 | Ren et al. | 370/252 |
| 2007/0087772 A1* | 4/2007 | Yi et al. | 455/522 |
| 2008/0186880 A1* | 8/2008 | Seki et al. | 370/281 |
| 2009/0061778 A1* | 3/2009 | Vrzic et al. | 455/62 |
| 2009/0122901 A1* | 5/2009 | Choi et al. | 375/267 |
| 2009/0202010 A1* | 8/2009 | Fu et al. | 375/260 |
| 2009/0202020 A1* | 8/2009 | Hafeez | 375/299 |
| 2010/0020757 A1 | 1/2010 | Walton et al. | 370/329 |
| 2010/0098006 A1* | 4/2010 | Golitschek Edler Von Elbwart et al. | 370/329 |
| 2010/0124880 A1* | 5/2010 | Wu et al. | 455/7 |
| 2010/0144356 A1* | 6/2010 | Li et al. | 455/446 |
| 2010/0172310 A1* | 7/2010 | Cheng et al. | 370/329 |
| 2011/0002285 A1* | 1/2011 | Kim et al. | 370/329 |
| 2011/0019625 A1* | 1/2011 | Zhang et al. | 370/329 |
| 2011/0136494 A1* | 6/2011 | Kim et al. | 455/450 |
| 2011/0158351 A1* | 6/2011 | Gorokhov et al. | 375/316 |
| 2011/0170496 A1* | 7/2011 | Fong et al. | 370/329 |
| 2011/0183679 A1* | 7/2011 | Moon et al. | 455/450 |
| 2011/0222434 A1* | 9/2011 | Chen | 370/254 |
| 2011/0223958 A1* | 9/2011 | Chen et al. | 455/522 |
| 2011/0223959 A1* | 9/2011 | Chen | 455/522 |
| 2011/0223960 A1* | 9/2011 | Chen et al. | 455/522 |
| 2011/0223961 A1* | 9/2011 | Chen et al. | 455/522 |
| 2011/0235598 A1* | 9/2011 | Hilborn | 370/329 |
| 2012/0093108 A1* | 4/2012 | Wengerter et al. | 370/329 |
| 2012/0127931 A1* | 5/2012 | Gaal et al. | 370/329 |
| 2012/0147772 A1* | 6/2012 | Kazmi et al. | 370/252 |
| 2012/0147846 A1* | 6/2012 | Ho et al. | 370/330 |
| 2012/0170479 A1* | 7/2012 | Ren et al. | 370/252 |
| 2012/0170524 A1* | 7/2012 | Ren et al. | 370/329 |
| 2012/0231790 A1* | 9/2012 | Lindoff et al. | 455/434 |
| 2012/0236736 A1* | 9/2012 | Frank et al. | 370/252 |
| 2012/0257519 A1* | 10/2012 | Frank et al. | 370/252 |
| 2013/0003591 A1* | 1/2013 | Novak et al. | 370/252 |
| 2013/0005240 A1* | 1/2013 | Novak et al. | 455/11.1 |
| 2013/0005375 A1* | 1/2013 | Chen | 455/509 |
| 2013/0039330 A1* | 2/2013 | Kishiyama et al. | 370/329 |
| 2013/0064197 A1* | 3/2013 | Novak et al. | 370/329 |
| 2013/0083755 A1* | 4/2013 | Berberana Fernandez-Murias et al. | 370/329 |
| 2013/0250913 A1* | 9/2013 | Geirhofer et al. | 370/331 |
| 2013/0310060 A1* | 11/2013 | Boudreau et al. | 455/452.1 |
| 2013/0329667 A1* | 12/2013 | Wengerter et al. | 370/329 |
| 2014/0024388 A1* | 1/2014 | Earnshaw et al. | 455/452.2 |
| 2014/0079005 A1* | 3/2014 | McCoy et al. | 370/329 |
| 2014/0169198 A1* | 6/2014 | Golitschek Edler von Elbwart | 370/252 |
| 2014/0198765 A1* | 7/2014 | Krishnamurthy et al. | 370/330 |
| 2014/0219239 A1* | 8/2014 | Li et al. | 370/330 |

OTHER PUBLICATIONS

C. Mohanram et al., Joint Subcarrier and Power Allocation in Channel-Aware Queue-Aware Scheduling for Multiuser OFDM, IEEE Transactions on Wireless Communications, vol. 6, No. 9, © 2007 IEEE.

H. T. Cheng et al., Joint Power-Frequency-Time Resource Allocation in Clustered Wireless Mesh Networks, IEEE Network Magazine, Jan./Feb. 2008, © 2008 IEEE.

S. V. Hanly et al., Dynamic Allocation of Subcarriers and Transmit Powers in an OFDMA Cellular Network, IEEE Transactions on Information Theory, vol. 55 Issue 12, Dec. 2009.

L. Sarperi et al., Simulation Study of Fractional Frequency Reuse in WiMAX Networks, Fujitsu Scientific & Technical Journal (FSTJ) vol. 44, No. 3, Jul. 2008.

A.L. Stolyar et al., Self-organizing Dynamic Fractional Frequency Reuse in OFDMA Systems , INFOCOM'2008.

C-L Tsai et. al., Interference Mitigation for 802.16m, IEEE C802.16m-08/583r1. Date submitted: Jul. 14, 2008.

* cited by examiner

SYSTEM AND METHOD FOR IMPLEMENTING COORDINATED RESOURCE ALLOCATIONS

TECHNICAL FIELD OF THE INVENTION

This invention relates in general to wireless networks and, more particularly, to a system and method for implementing coordinated resource allocations.

BACKGROUND OF THE INVENTION

Distributed antenna systems consist of a base station (also known as a Radio Element Control or a Baseband Unit) and one or more remote transceivers (also known as Radio Elements or Remote Radio Heads). These components provide endpoints with wireless network access. To aid the distributed antenna system in distinguishing between the various wireless transmissions to and from the various endpoints, each endpoint may have one or more unique resource blocks assigned thereto. Each resource block may comprise a unique combination of a subcarrier or subcarriers and a time slot or time slots.

Within a distributed antenna system, the remote transceivers are distributed around different locations while being connected via a wired connection (e.g., optical fiber) to the base station. While there may be multiple remote transceivers, from the perspective of an endpoint there is only one entity, the base station. Each remote transceiver transmits essentially the same core data, and the endpoint combines multiple signals from multiple remote transceivers into a single communication.

The base station communicates with the remote transceivers using, for example, the Common Public Radio Interface (CPRI) standard. The CPRI standard allows in-phase/quadrature (I/Q) data to be transmitted from the base station to the remote transceivers. The remote transceivers use the I/Q data to form the transmissions that are sent to any endpoints connected thereto. The remote transceivers are also able to communicate with the base station using the CPRI standard. This allows the remote transceivers to relay data received from the endpoints and to communicate control information, such as signal quality, to the base station.

SUMMARY

In accordance with a particular embodiment, a method for implementing coordinated resource allocations includes establishing one or more connections between a first base station and one or more remote transceivers. The method also includes establishing one or more wireless connections with one or more endpoints via at least one of the one or more remote transceivers. The one or more wireless connections use a first channel. The method further includes determining a schedule that assigns a first number of resource blocks to each endpoint of the one or more endpoints. The method additionally includes receiving one or more neighboring transceiver schedules determined by one or more neighboring base stations. Each neighboring transceiver schedule indicating a different number of resource blocks assigned to each neighboring remote transceiver connected to the respective neighboring base station. The method also includes determining one or more time slots and one or more subcarriers within the first channel to assign to each resource block for each endpoint of the one or more endpoints based on the schedule and the one or more neighboring transceiver schedules. The method further includes determining a power distribution for each resource block for each endpoint of the one or more endpoints.

Technical advantages of particular embodiments may include increasing the uplink and downlink capacity of a distributed antennae system. Another technical advantage of particular embodiments may include using neighboring transceiver schedules when determining the time slots and subcarriers to assign to each endpoint. Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments and their advantages, reference is now made to the following description, taken in conjunction with the accompanying drawings, in which.

DETAILED DESCRIPTION

Figure 1:
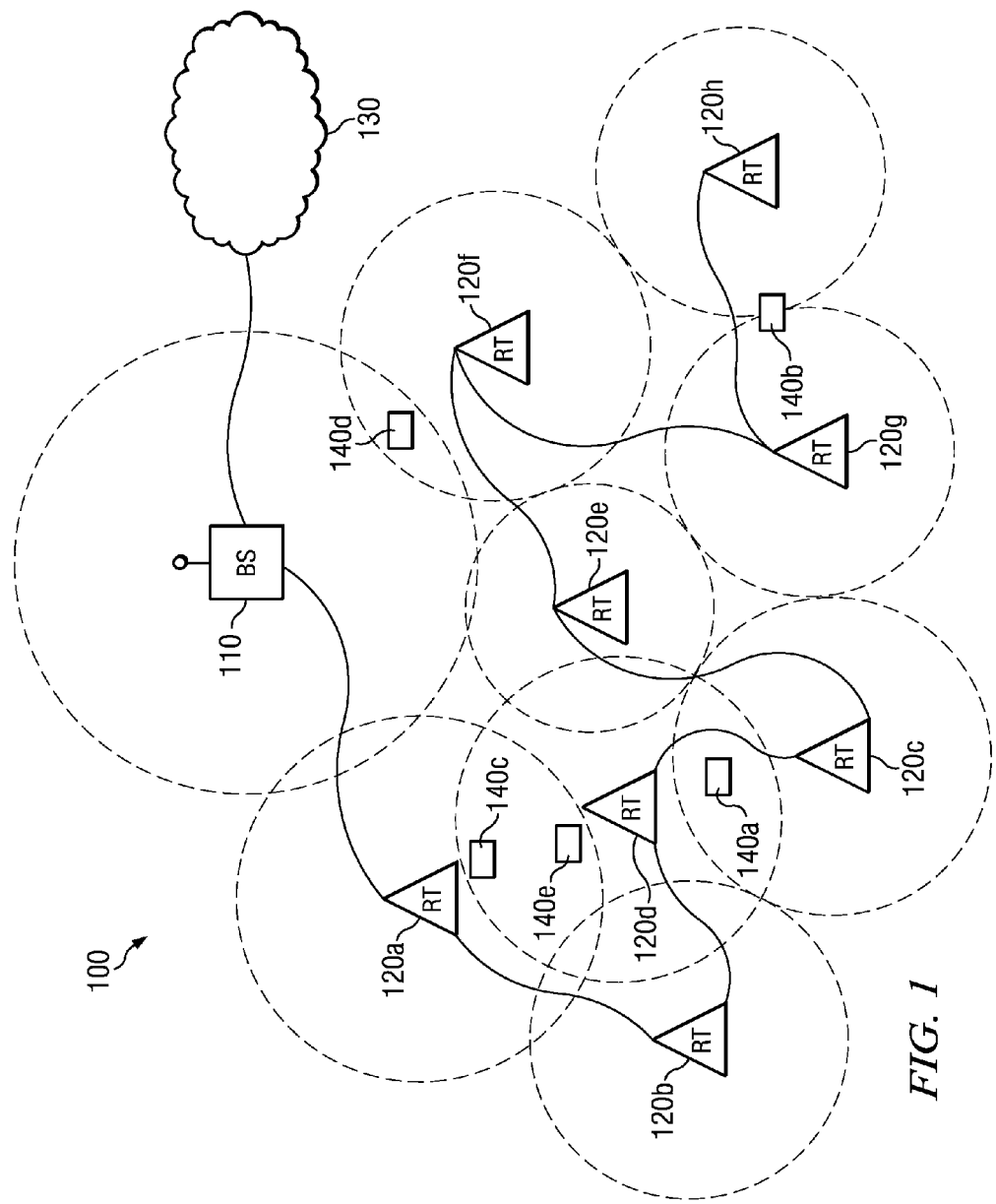
FIG. 1 illustrates a distributed antenna system comprising a base station and a plurality of remote transceivers, in accordance with a particular embodiment.

FIG. 1 illustrates a distributed antenna system comprising a base station and a plurality of remote transceivers, in accordance with a particular embodiment. Distributed antenna system 100 comprises base station 110 and multiple remote transceivers 120. Wireless communications may be transmitted by remote transceivers 120 at varying power levels. The power of a particular transmission, comprising one or more subcarriers, from a particular remote transceiver (e.g., remote transceiver 120d) to a particular endpoint (e.g., endpoint 140c) may depend on the signal quality between the particular endpoint and the particular remote transceiver. The transmission power of each subcarrier at each remote transceiver may be greater than or less than a standard power level. The standard power level may be based on an equal distribution of power among the subcarriers (e.g., all transmissions are transmitted with the same power). Increasing or decreasing the transmission power for each endpoint 140 at each remote transceiver 120 may increase the capacity of distributed antenna system 100 as compared to a system utilizing uniform power across all subcarriers.

Base station 110 may also assign particular resource blocks to particular remote transceivers 120 for use in communicating with endpoints 140. The resource blocks may be assigned based on a locally determined schedule determining the number of resource blocks to assign to each endpoint and one or more neighboring transceiver schedules identifying the number of resource blocks neighboring base stations have assigned to each of their respective remote transceivers. In assigning the resource blocks, base station 110 may determine the time slots and/or subcarriers that are to be individually assigned to endpoints 140. The resource blocks may be assigned so as to attempt to avoid causing interference with neighboring remote transceivers under the control of neighboring base stations. In certain embodiments, the assignment of resource blocks may involve a relatively low communication overhead (e.g., neighboring base stations may only communicate the number of resource blocks assigned to their remote transceivers and periodically send center point information) and a computationally efficient and easy to implement algorithm.

Distributed antenna system 100 may be coupled to network 130 via base station 110. Distributed antenna system 100 provides wireless coverage for endpoints 140 over a large geographic area. For example, a single base station (e.g., base station 110) and a plurality of remote transceivers (e.g., remote transceivers 120) may be used to provide wireless coverage for an entire building, a city block, a campus, or any other area. Because remote transceivers 120 are distributed over a geographical area, the distance between an endpoint and each remote transceiver 120 may be different. In particular embodiments, the signal quality between an endpoint and a remote transceiver may generally increase as the endpoint gets closer to the remote transceiver. Particular embodiments may take advantage of this increased signal quality by increasing the transmission power for the subcarriers associated with the signal having the better quality. Because a remote transceiver has a finite amount of transmission power, an increase in power for a particular subcarrier may be balanced by a corresponding decrease in power of another subcarrier.

In certain scenarios, a particular geographic area may be covered by multiple distributed antenna systems. For example, multiple base stations, each controlling their own respective set of remote transceivers, may be deployed to provide wireless service in large areas where the number of remote transceivers is more than a single base station can manage. In such a scenario, the wireless service provider operating distributed antenna system 100 may wish for the separate distributed antenna systems to use the same channel, or range of channels. Because each base station only controls the resources used by its own remote transceivers, there is a risk of interference from neighboring remote transceivers. Certain embodiments may attempt to mitigate this risk by assigning a remote transceiver block ("RT block") of resources to each remote transceiver. The RT blocks may be shifted from a default center position based on the neighboring center points of neighboring remote transceivers to reduce the amount of overlapping resource blocks.

Depending on the embodiment, distributed antenna system 100 may use any of a variety of wireless technologies or protocols (e.g., IEEE 802.16m or 802.16e, or long term evolution (LTE)) for communications between remote transceivers 120 and endpoints 140. In certain instances, multiple remote transceivers 120 may appear to endpoints 140 as a single entity—an extension of base station 110. The multiple remote transceivers 120 may attempt to send the same core data to endpoints 140 and may potentially receive the same data from endpoints 140. The differences in how the data is sent or received may be the result of the respective distances and/or transmission power of each remote transceiver 120 to a particular endpoint.

Depending on the embodiment, distributed antenna system 100 may use any of a variety of different wired technologies or protocols (e.g., CPRI) for communications between remote transceivers 120 and base station 110. In particular embodiments, base station 110 may be configured to adjust the power, either directly (e.g., be incorporating the power distribution in the I/Q samples that are sent to the remote transceivers) or indirectly (e.g., providing power distribution values to each remote transceiver from which the remote transceivers can determine their respective power distribution), that each remote transceiver applies to its transmissions. By selectively increasing or decreasing the transmission power for particular subcarriers (associated with particular endpoints) at particular remote transceivers, base station 110 may be able to more efficiently use the available wireless resources.

In certain embodiments, base station 110 may be configured to determine the number and location of resource blocks that are assigned to endpoints 140. The location of a resource block may refer to its subcarrier and time slot. For example, the available frequencies of one or more channels may be divided into a number of subcarriers and the amount of time per frame may be divided into a number of time slots. A resource block may comprise one or more of the divided subcarriers and one of the divided time slots. Thus, the location of a resource block may refer to the combination of its subcarrier and time slot. The resource blocks may be assigned in a manner to reduce the amount of interference. This assignment may be based, in part, on reducing the amount of overlapping resource blocks between remote transceivers 120 and neighboring remote transceivers. By assigning resources blocks in such a manner, base station 110 may be able to reduce the amount of interference and/or increase the overall data throughput of wireless system 100.

Depending on the embodiment, base station 110 may use signal quality information from the various remote transceivers to determine the number of resource blocks to assign to each endpoint and/or the power distribution for each subcarrier for each remote transceiver 120. The signal quality information may include the received uplink power strength, the maximal usable modulation and coding scheme (MCS) level, the Carrier to Interference-plus-Noise Ratio (CINR) of the wireless connection. In particular embodiments, uplink sounding may be used to estimate the channel gain and interference strength between endpoints 140 and remote transceivers 120. In some embodiments, the signal strength may be used to determine the location of an endpoint within the coverage area of a particular remote transceiver.

Network 130 may be any network or combination of networks capable of transmitting signals, data, and/or messages, including signals, data or messages transmitted through WebPages, e-mail, text chat, voice over IP (VoIP), and instant messaging. Network 130 may include one or more LANs, WANs, MANs, PSTNs, WiMAX networks, global distributed networks such as the Internet, Intranet, Extranet, or any other form of wireless or wired networking. Network 130 may use any of a variety of protocols for either wired or wireless communication.

Base station 110 may include any combination of hardware, software embedded in a computer readable medium, and/or encoded logic incorporated in hardware or otherwise stored (e.g., firmware) to implement any number of communication protocols that allow for the wireless exchange of packets in distributed antenna system 100. Base station 110 may be configured to determine and distribute an allocation of resources (e.g., number and location of resources blocks and power allocation) to each remote transceiver 120. Depending on the embodiment, base station 110 may apply the power distribution to the data before it is sent to the remote transceivers for transmission or base station 110 may allow each remote transceiver 120 to individually apply the power distribution.

Remote transceivers 120 may include any combination of hardware, software embedded in a computer readable medium, and/or encoded logic incorporated in hardware or otherwise stored (e.g., firmware) to implement any number of communication protocols that allow for the wireless exchange of packets with endpoints 140 in distributed antenna system 100. In some embodiments, remote transceivers 120 receive data from base station 110 that may already include the power distribution determinations made by base station 110. In particular embodiments, each remote transceiver 120 may adjust the transmission power of the core data received from base station 110. The adjustments may be made based on one or more control signals sent from base station 110 specifying the transmission power for each subcarrier, or plurality of subcarriers, at each respective remote transceiver 120. The one or more control signals may also be used to receive the resource block allocation.

Endpoints 140 may comprise any type of wireless device able to send and receive data and/or signals to and from base station 110 via remote transceivers 120. Some possible types of endpoints 140 may include desktop computers, PDAs, cell phones, laptops, and/or VoIP phones. Endpoints 140 may provide data or network services to a user through any combination of hardware, software embedded in a computer readable medium, and/or encoded logic incorporated in hardware or otherwise stored (e.g., firmware). Endpoints 140 may also include unattended or automated systems, gateways, other intermediate components or other devices that can send or receive data and/or signals.

The following example may help illustrate particular features of certain embodiments. For purposes of this example, assume that base station 110 only controls two remote transceivers, remote transceivers 120a and 120d. Further assume that endpoints 140c and 140e are both located in the area served by remote transceivers 120a and 120d. To simplify the scenario, assume that the scheduling algorithm at base station 110 allocates the same number of resource blocks in a frame to each of endpoints 140c and 140e. Further assume that the magnitude of the channel gain between remote transceiver 120a and endpoint 140c is twice that of remote transceiver 120a and endpoint 140e; and that the magnitude of the channel gain between remote transceiver 120d and endpoint 140e is twice that of remote transceiver 120d and endpoint 140c. Then, based on these assumptions, base station 110 may allocate ⅔ of remote transceiver 120a's power to the subcarriers used by endpoint 140c and ⅓ to the subcarriers used by endpoint 140e (as opposed to the even ½ and ½ distribution of a standard distributed antenna system). Similarly, base station 110 may allocate ⅔ of remote transceiver 120d's power to the subcarriers used by endpoint 140c and ⅓ to the subcarriers used by endpoint 140e.

Although FIG. 1 illustrates a particular number and configuration of endpoints, connections, links, and nodes, distributed antenna system 100 contemplates any number or arrangement of such components for communicating data. In addition, elements of distributed antenna system 100 may include components centrally located (local) with respect to one another or distributed throughout distributed antenna system 100.

Figure 2:
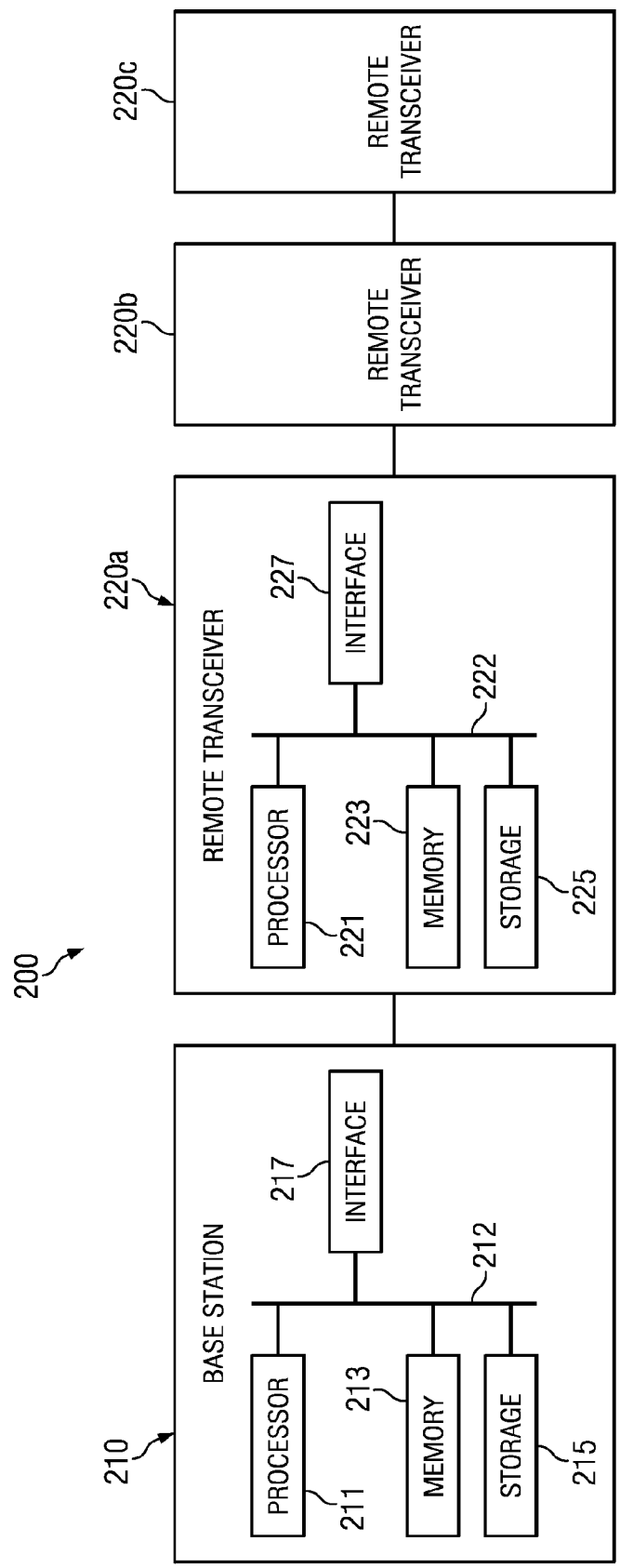
FIG. 2 illustrates a detailed block diagram of a base station and a remote transceiver within a distributed antenna system, in accordance with a particular embodiment.

FIG. 2 illustrates a detailed block diagram of a base station and a remote transceiver within a distributed antenna system, in accordance with a particular embodiment. Distributed antenna system 200 may be used with any of a variety of different wireless technologies, including, but not limited to, orthogonal frequency division multiple access (OFDMA) and next generation wireless system such as LTE-A and 802.16m.

Distributed antenna system 200 includes base station 210 and remote transceivers 220. Base station 210 and remote transceivers 220 may each include one or more portions of one or more computer systems. In particular embodiments, one or more of these computer systems may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of base station 210 and remote transceiver 220 may comprise any suitable physical form, configuration, number, type and/or layout. As an example, and not by way of limitation, base station 210 and/or remote transceiver 220 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, base station 210 and/or remote transceiver 220 may include one or more computer systems; be unitary or distributed; span multiple locations; span multiple machines; or reside in a cloud, which may include one or more cloud components in one or more networks.

Where appropriate, distributed antenna system 200 may perform without substantial spatial or temporal limitation one or more steps of one or more methods described or illustrated herein. As an example, and not by way of limitation, distributed antenna system 200 may perform in real time or in batch mode one or more steps of one or more methods described or illustrated herein. One or more distributed antenna systems may perform at different times or at different locations one or more steps of one or more methods described or illustrated herein, where appropriate.

In the depicted embodiment, base station 210 and remote transceiver 220 each include their own respective processors 211 and 221, memory 213 and 223, storage 215 and 225, interfaces 217 and 227, and buses 212 and 222. These components may work together to provide a distributed antenna system in which the resource allocation is based on both a local determination of the number of resource blocks to assign to each endpoint and the number of resource blocks being used by various neighboring remote transceivers. The components may also work together to provide a power distribution for each endpoint at each remote transceiver 220 that is based on a relative signal quality for each endpoint at each remote transceiver. Although a particular distributed antenna system is depicted having a particular number of particular components in a particular arrangement, this disclosure contemplates any suitable distributed antenna system 200 having any suitable number of any suitable components in any suitable arrangement. For simplicity, similar components of base station 210 and remote transceiver 220 will be discussed together wherein the components of remote transceiver 220 will be identified in parenthesis. However, it is not necessary for both devices to have the same components, or the same type of components. For example, processor 211 may be a general purpose microprocessor and processor 221 may be an application specific integrated circuit (ASIC).

Processor 211 (and/or 221) may be a microprocessor, controller, or any other suitable computing device, resource, or combination of hardware, software and/or encoded logic operable to provide, either alone or in conjunction with other components, (e.g., memory 213 or 223, respectively) wireless networking functionality. Such functionality may include providing various wireless features discussed herein. For example, processor 211 may determine how to allocate resources among remote transceivers 220. Additional examples and functionality provided, at least in part, by processor 211 (and/or 221) will be discussed below.

In particular embodiments, processor 211 (and/or 221) may include hardware for executing instructions, such as those making up a computer program. As an example and not by way of limitation, to execute instructions, processor 211 (and/or 221) may retrieve (or fetch) instructions from an internal register, an internal cache, memory 213 (and/or 223), or storage 215 (and/or 225); decode and execute them; and then write one or more results to an internal register, an internal cache, memory 213 (and/or 223), or storage 215 (and/or 225).

In particular embodiments, processor 211 (and/or 221) may include one or more internal caches for data, instructions, or addresses. This disclosure contemplates processor 211 (and/or 221) including any suitable number of any suitable internal caches, where appropriate. As an example and not by way of limitation, processor 211 (and/or 221) may include one or more instruction caches, one or more data caches, and one or more translation lookaside buffers (TLBs). Instructions in the instruction caches may be copies of instructions in memory 213 (and/or 223) or storage 215 (and/or 225) and the instruction caches may speed up retrieval of those instructions by processor 211 (and/or 221). Data in the data caches may be copies of data in memory 213 (and/or 223) or storage 215 (and/or 225) for instructions executing at processor 211 (and/or 221) to operate on; the results of previous instructions executed at processor 211 (and/or 221) for access by subsequent instructions executing at processor 211 (and/or 221), or for writing to memory 213 (and/or 223), or storage 215 (and/or 225); or other suitable data. The data caches may speed up read or write operations by processor 211 (and/or 221). The TLBs may speed up virtual-address translations for processor 211 (and/or 221). In particular embodiments, processor 211 (and/or 221) may include one or more internal registers for data, instructions, or addresses. Depending on the embodiment, processor 211 (and/or 221) may include any suitable number of any suitable internal registers, where appropriate. Where appropriate, processor 211 (and/or 221) may include one or more arithmetic logic units (ALUs); be a multi-core processor; include one or more processors 211 (and/or 221); or any other suitable processor.

Memory 213 (and/or 223) may be any form of volatile or non-volatile memory including, without limitation, magnetic media, optical media, random access memory (RAM), read-only memory (ROM), flash memory, removable media, or any other suitable local or remote memory component or components. In particular embodiments, memory 213 (and/or 223) may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 213 (and/or 223) may include one or more memories 213 (and/or 223), where appropriate. Memory 213 (and/or 223) may store any suitable data or information utilized by base station 210 (and/or remote transceiver 220), including software embedded in a computer readable medium, and/or encoded logic incorporated in hardware or otherwise stored (e.g., firmware). In particular embodiments, memory 213 (and/or 223) may include main memory for storing instructions for processor 211 (and/or 221) to execute or data for processor 211 (and/or 221) to operate on. In particular embodiments, one or more memory management units (MMUs) may reside between processor 211 (and/or 221) and memory 213 (and/or 223) and facilitate accesses to memory 213 (and/or 223) requested by processor 211 (and/or 221).

As an example and not by way of limitation, base station 210 may load instructions from storage 215 (and/or 225) or another source (such as, for example, another computer system, another base station, or a remote transceiver) to memory 213 (and/or 223). Processor 211 (and/or 221) may then load the instructions from memory 213 (and/or 223) to an internal register or internal cache. To execute the instructions, processor 211 (and/or 221) may retrieve the instructions from the internal register or internal cache and decode them. During or after execution of the instructions, processor 211 (and/or 221) may write one or more results (which may be intermediate or final results) to the internal register or internal cache. Processor 211 (and/or 221) may then write one or more of those results to memory 213 (and/or 223). In particular embodiments, processor 211 (and/or 221) may execute only instructions in one or more internal registers or internal caches or in memory 213 (and/or 223) (as opposed to storage 215 (and/or 225) or elsewhere) and may operate only on data in one or more internal registers or internal caches or in memory 213 (and/or 223) (as opposed to storage 215 (and/or 225) or elsewhere).

In particular embodiments, storage 215 (and/or 225) may include mass storage for data or instructions. As an example and not by way of limitation, storage 215 (and/or 225) may include a hard disk drive (HDD), a floppy disk drive, flash memory, an optical disc, a magneto-optical disc, magnetic tape, or a Universal Serial Bus (USB) drive or a combination of two or more of these. Storage 215 (and/or 225) may include removable or non-removable (or fixed) media, where appropriate. Storage 215 (and/or 225) may be internal or external to base station 210 (and/or remote transceiver 220), where appropriate. In particular embodiments, storage 215 (and/or 225) may be non-volatile, solid-state memory. In particular embodiments, storage 215 (and/or 225) may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 215 (and/or 225) may take any suitable physical form and may comprise any suitable number or type of storage. Storage 215 (and/or 225) may include one or more storage control units facilitating communication between processor 211 (and/or 221) and storage 215 (and/or 225), where appropriate.

In particular embodiments, interface 217 (and/or 227) may include hardware, encoded software, or both providing one or more interfaces for communication (such as, for example, packet-based communication) between base station 210, remote transceivers 220, any endpoints being serviced by base station 210, any networks, any network devices, and/or any other computer systems. As an example and not by way of limitation, communication interface 217 (and/or 227) may include a network interface controller (NIC) or network adapter for communicating with an Ethernet or other wire-based network and/or a wireless NIC (WNIC) or wireless adapter for communicating with a wireless network.

In some embodiments, interface 217 (and/or 227) may comprise one or more radios coupled to one or more antennas. In such an embodiment, interface 217 (and/or 227) may receive digital data that is to be sent out to wireless devices, such as endpoints, via a wireless connection. The radio may convert the digital data into a radio signal having the appropriate center frequency, bandwidth parameters, and transmission power. The power distribution for the radio signal may have been determined and applied to each subcarrier at base station 210, or the power distribution may be determined at base station 210 and applied by remote transceivers 220. Similarly, the radios may convert radio signals received via the antenna into digital data to be processed by, for example, processor 211 (and/or 221). In some embodiments, base station 210 may process the data by: Applying MRC to the individual incoming I/Q samples from each remote transceiver 220; determining the average received power of each subcarrier at each remote transceiver 220; determining the number and location of resources blocks to assign to each endpoint; determining the number and location of resource blocks assigned to endpoints at each remote transceiver 220; allocating transmission power to each subcarrier for each remote transceiver 220; and perform power amplification and inverse fast Fourier transform on the data to be sent to the endpoints. In some embodiments, processing the data may comprise, at remote transceivers 220, determining the average received power for each subcarrier and combining the data from the endpoint with data from the same endpoint provided by an upstream remote transceiver. Then, at base station 210, a power distribution is determined for each subcarrier for each remote transceiver 220.

Depending on the embodiment, interface 217 (and/or 227) may be any type of interface suitable for any type of network for which distributed antenna system 200 is used. As an example and not by way of limitation, distributed antenna system 200 may communicate with an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, distributed antenna system 200 may communicate with a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. Base station 210 (and/or remote transceivers 220) may include any suitable interface 217 (and/or 227) for any one or more of these networks, where appropriate.

In some embodiments, interface 217 (and/or 227) may include one or more interfaces for one or more I/O devices. One or more of these I/O devices may enable communication between a person and base station 210 (and/or remote transceivers 220). As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 117 (and/or 227) for them. Where appropriate, interface 117 (and/ or 227) may include one or more drivers enabling processor 211 (and/or 221) to drive one or more of these I/O devices. Interface 117 (and/or 227) may include one or more interfaces 117 (and/or 227), where appropriate.

Bus 212 (and/or 222) may include any combination of hardware, software embedded in a computer readable medium, and/or encoded logic incorporated in hardware or otherwise stored (e.g., firmware) to couple components of base station 210 (and/or remote transceiver 220) to each other. As an example and not by way of limitation, bus 212 (and/or 222) may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 212 (and/or 222) may include any number, type, and/or configuration of buses 212 (and/or 222), where appropriate. In particular embodiments, one or more buses 212 (which may each include an address bus and a data bus) may couple processor 211 (and/or 221) to memory 213 (and/or 223). Bus 212 (and/or 222) may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

Particular embodiments may include one or more computer-readable storage media implementing any suitable storage. In particular embodiments, a computer-readable storage medium implements one or more portions of processor 211 (and/or 221) (such as, for example, one or more internal registers or caches), one or more portions of memory 213 (and/or 223), one or more portions of storage 215 (and/or 225), or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

The components and devices illustrated in FIG. 2 form distributed antenna system 200. From the perspective of an endpoint, it may be convenient to think of distributed antenna system 200 as a single base station. An endpoint may be unable to distinguish between a wireless transmission sent by remote transceiver 220a and a wireless transmission sent by remote transceiver 220b. The channel experienced by an endpoint is the sum of the channel responses from each of remote transceivers 220.

In particular embodiments, base station 210 may communicate with remote transceivers 220 using Common Public Radio Interface (CPRI). The CPRI specification supports a variety of topologies, including ring, tree, star, and chain topologies. Through any one of these topologies, base station 210 may be able to communicate with remote transceivers 220. For example, the CPRI links may be used by base station 210 to communicate the location of the resource blocks each remote transceiver 220 is to use. In some embodiments, the CPRI link may be used by base station 210 to send/receive different in-phase/quadrature (I/Q) data to/from different remote transceivers 220. For example, in some embodiments, base station 210 may apply the power distribution locally. This may result in each remote transceiver receiving its own unique I/Q sample. In particular embodiments, the CPRI link may be used to send/receive a single set of I/Q samples from remote transceivers 220. For example, in some embodiments the power distribution may be applied individually at each respective remote transceiver. This may allow a single I/Q sample to be used by all remote transceivers 220.

Figure 3:
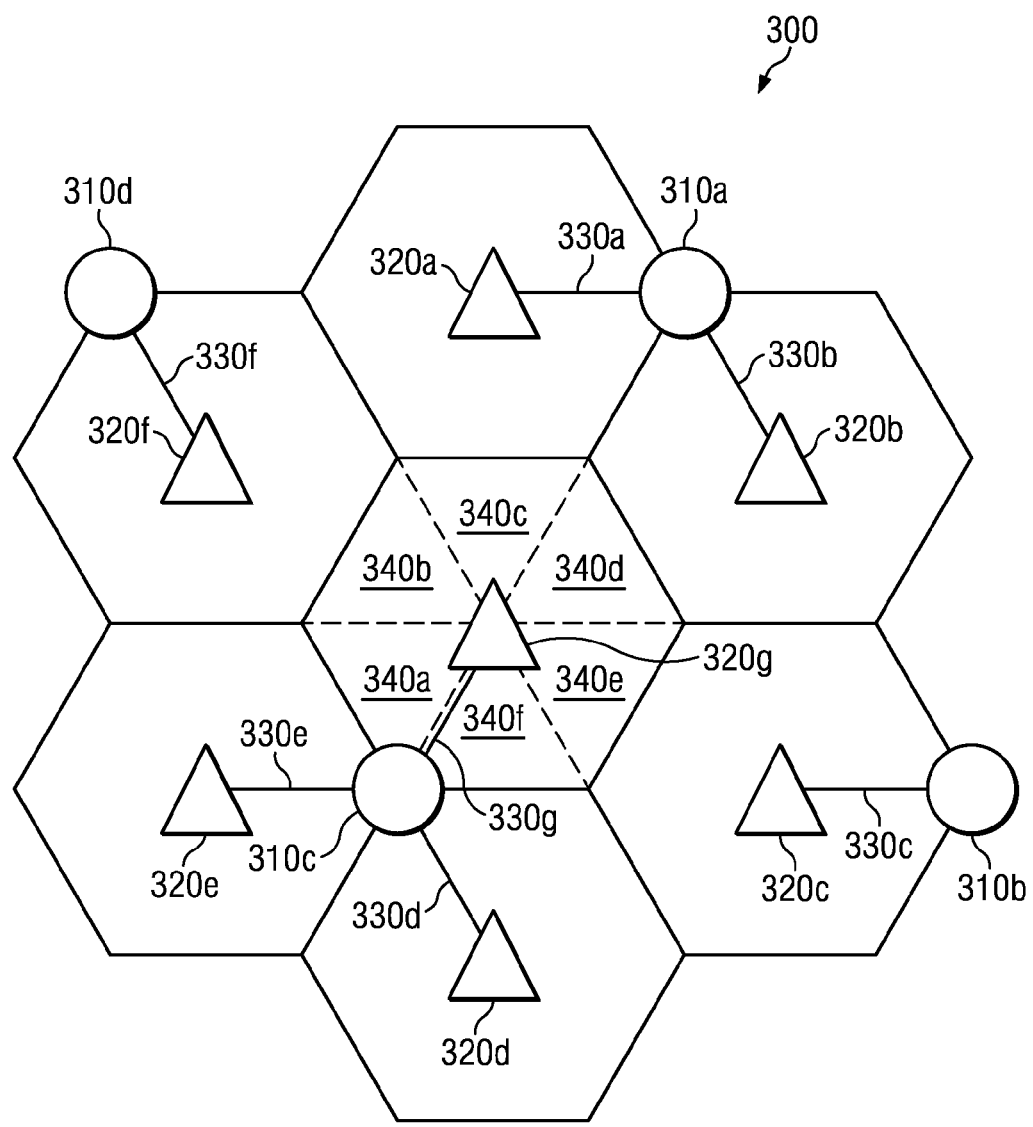
FIG. 3 illustrates a block diagram of a wireless coverage map provided by a plurality of base stations and remote transceivers, in accordance with a particular embodiment.

FIG. 3 illustrates a block diagram of a wireless coverage map provided by a plurality of base stations and remote transceivers, in accordance with a particular embodiment. In certain embodiments, each base station 310 and remote transceiver 320 may comprise components similar to the components of base station 210 and remote transceiver 220a, respectively. As indicated above, each base station 310 may have established a CPRI connection with at least one remote transceiver 320. In the embodiment depicted in FIG. 3, each base station 310 may have a wired connection, such as wired connection 330, to three remote transceivers 320. For simplicity, the area depicted in coverage map 300 only illustrates base station 310c with all three remote transceivers, 320e, 320d, 320g—the third remote transceiver coupled to base station 310a and the second and third remote transceivers coupled to base stations 310b and 310d are not depicted. Also not depicted within coverage map 300 are the one or more endpoints having one or more wireless connections with one or more remote transceivers 320. These endpoints may communicate with base stations 310 via one or more of the remote transceivers 320 depending on the locations of the endpoints.

The wireless signals sent to or received from an endpoint may be communicated to/from a respective base station 310 via one or more remote transceivers 320 coupled to the same base station 310. For example, remote transceivers 320a and 320b may receive the same signal from an endpoint and relay that signal to base station 310a. Base station 310a may comprise a processor (e.g., similar to processor 211) that is able to make several different determinations based on the received signals from remote transceivers 320a and 320b. For example, the processor may be able to determine signal quality, interference levels, signal strength, and/or any other parameters or features associated with the wireless connections between the endpoint and remote transceivers 320a and 320b. This information may be used, for example, to determine an efficiency of data transmission (e.g., the modulation and coding scheme (MCS) being used by the endpoint) and/or data throughput. The data throughput may be used in determining the number of resource blocks to assign to the endpoint at each respective remote transceiver 320.

The signal information may also be used by the processor to determine a sector location of an endpoint. The sector location identifying within which sector 340 the endpoint is located. One way in which the sector location of an endpoint may be determined is by comparing the received signal strength (e.g., measured in dB) from an endpoint at, for example, remote transceivers 320e, 320d, and 320g. For example, if the received signal strength at remote transceiver 320g is much, much greater than the received signal strength at remote transceiver 320d which is greater than the received signal strength at remote transceiver 320e (e.g., 320g>>>320d>320e), then the processor may determine that the endpoint is within sector 340d. As another example, if the received signal strength at remote transceiver 320g is greater than the received signal strength at remote transceiver 320d which is greater than the received signal strength at remote transceiver 320e (e.g., 320g>320d>320e), the processor may determine that the endpoint is within sector 340f. In some embodiments, the processor may use one or more threshold values to distinguish between signal strengths that are greater than; much greater than; and much, much greater than one another.

In some embodiments, the processor may calculate the difference in signal levels using an equation, such as, $d_{12}=10*\log(P_{RT1}/P_{RT2})$; where $d_{12}$ is the difference in signal levels between a first remote transceiver and a second remote transceiver; $P_{RT1}$ is the signal level at the first remote transceiver and $P_{RT2}$ is the signal level at the second remote transceiver. Once the difference in signal levels has been determined for each relevant combination of remote transceivers for a particular endpoint, the difference in signal levels for the endpoint may be summed together and used to determine the location of the resource blocks assigned to that endpoint. For example, with respect to remote transceiver 320g, the processor of base station 310c may, for each endpoint connected thereto, determine the difference in the signal level received from the respective endpoint at remote transceiver 320g compared with remote transceiver 320d, and at remote transceiver 320g compared with remote transceiver 320e. The processor may then add together the resulting differences in signal levels for each endpoint. The resulting sum for each endpoint may be used to create an ordered list in which the first endpoint in the list has the highest total and the last endpoint in the list has the lowest total. The processor may then allocate resource blocks to the endpoints starting at the top of the sorted list. The processor may begin by allocating the resources blocks around the center point of the RT block associated with remote transceiver 320g to the endpoints at the top of the list. As the processor works its way down the list, it may allocate resource blocks to the "left" or the "right" of the center point based on the sector location of the corresponding endpoint.

In certain embodiments, the signal quality information may be stored in memory (e.g., similar to memory 213) and may be used by the processor to determine a schedule. The schedule may assign a particular number of resource blocks to each endpoint at each respective remote transceiver. In some embodiments, such as where coverage map 300 is for an LTE wireless network, a resource block may comprise twelve subcarriers and a timeslot having a duration of 0.5 ms. The resource blocks may be assigned to ensure that each endpoint receives an adequate number of resources. The number of resource blocks assigned to each endpoint may vary depending on the number of endpoints, the relative signal qualities associated with the endpoints, policies being used by the respective base station 310 (e.g., resource fare or rate fare), the size of the licensed channel available to base station 310 and/or any other factors (e.g., a QoS level subscribed to by the endpoint) used in determining the number of resource blocks to assign to a particular endpoint. In some embodiments, the number of resource blocks assigned to each endpoint may be saved in memory.

In certain embodiments, each processor of each base station 310 may independently determine its own respective schedule based on information gathered by its own remote transceivers 320. This may allow base stations 310 to determine their own schedule without receiving scheduling information from neighboring base stations. In some embodiments, after a base station, such as base station 310c, has determined its schedule, information regarding the number of resource blocks assigned to each remote transceiver may be determined. For example, base station 310c may use the sector location of the endpoints to determine the coverage area within which the endpoint is located. In some instances, a less precise general location may be used to determine the coverage area within which an endpoint is located. Based on the determined coverage area within which an endpoint is located and the number of resource blocks assigned to the endpoint, base station 310c may be able to determine the number of resource blocks being used by remote transceivers 320d, 320e, and 320g. Base station 310c may then send to neighboring base stations 310 information regarding the number of resource blocks assigned to the endpoints for remote transceivers 320d, 320e, and 320g. Base station 310c may also receive information from neighboring base stations regarding the number of resource blocks assigned to the respective neighboring remote transceivers. In some instances the resource blocks assigned to a particular remote transceiver may be arranged in a RT block. In some embodiments, base station 310c may group together the resource blocks of a RT block such that the resources blocks of an RT block comprise adjacent resource blocks. This may allow endpoints within the coverage area of a particular remote transceiver to use adjacent resource blocks. The neighboring resource block information may be stored in memory (e.g., similar to memory 213).

In certain embodiments, the neighboring resource block information may be used by the processor of base station 310c to minimize intercell interference when determining the locations of the resource blocks assigned to particular endpoints within the coverage area of particular remote transceivers 320. Intercell interference may most likely occur where overlapping resource blocks are being used by two adjacent remote transceivers (e.g., remote transceivers 320g and 320b) that are controlled by two different base stations (e.g., base stations 310c and 310a). When base station 310c is assigning resource blocks to remote transceiver 320g, base station 310c may recognize that there may be a greater likelihood of interference caused by remote transceivers 320f, 320a, 320b, and 320c because these remote transceivers are adjacent to remote transceiver 320g. Accordingly, the processor of base station 310c may attempt to assign the locations of resource blocks for remote transceiver 320g so as to minimize the amount of overlap with the resource blocks assigned to the neighboring remote transceivers 320.

In certain instances, the resource blocks assigned to a particular remote transceiver, such as remote transceiver 320e, may be arranged as an RT block. Each RT block may vary in size depending on the number of resource blocks assigned to the endpoints connected through the respective remote transceiver. Cumulatively, the combination of the RT blocks of remote transceivers 320d, 320e, and 320g may comprise the available resource blocks of the channel or channels licensed for use by base station 310c. A center point associated with each RT block may specify where the corresponding RT block is located within the channel or channels licensed for use by base station 310c. The processor may help reduce the amount of overlap by shifting the RT blocks by a determined shift amount. The shift amount may be based on the neighboring center points of the neighboring RT blocks.

In some embodiments, base station 310c may estimate the center points of the neighboring RT blocks assigned to neighboring remote transceivers. In some scenarios, the neighboring center points may be estimated based on historical center point information received from the neighboring base stations 310. The historical center point information may be received less frequently than the information regarding the number of resource blocks assigned to neighboring remote transceivers. In certain embodiments, the historical center point information may comprise an average center point associated with the neighboring RT blocks. Using the center point of the neighboring RT blocks and the number of resource blocks assigned to the neighboring remote transceivers, the processor of base station 310c may estimate which resource blocks are assigned to neighboring remote transceivers.

Based on the estimated resource block locations of neighboring remote transceivers, base station 310c may shift the center point of its RT blocks for its own remote transceivers to reduce the amount of overlapping resource blocks. For example, the processor of base station 310c may use the following equation along with information supplied by neighboring base stations as well as its own determinations to estimate a shift in its own RT blocks so as to minimize the amount of overlapping resource blocks:

$$s_i = \mathrm{argmin} \sum_{j=1}^{Lx_i} |s + j - Cx_i| + \sum_{k=1}^{Ly_i} |s + Lx_i + k - Cy_i| + \sum_{l=1}^{Lz_i} |s + Lx_i + Ly_i + l - Cz_i|$$

In the above equation, s is the shift amount base station 310c will make from a default center point to the actual center point for remote transceivers 320d, 320e, and 320g; $Lx_i$ is the number of resource blocks assigned to remote transceiver x associated with base station i; and $Cx_i$ is the center point of the RT block assigned to remote transceiver x associated with base station i.

Once the processor has determined the amount of shift in the center points of the RT blocks, it may determine how individual resource blocks within each RT block will be assigned to individual endpoints. This may be done so as to reduce the amount of interference caused to neighboring remote transceivers. The processor may reduce the chance of interference by, for example, taking into account the sector location of individual endpoints. For example, endpoints in sector 340b may be assigned resource blocks that do not overlap with the resource blocks assigned to the endpoints within the coverage area of remote transceiver 320f.

Once the location (subcarriers and time slots) of the resource blocks have been determined, the processor of base station 310c may determine the allocation of power to different subcarriers at remote transceivers 320d, 320e, and 320g may be determined based on channel response information associated with each endpoint at each respective remote transceiver 320d, 320e, and 320g. In particular embodiments, base station 310c may allocate more power to the resource blocks for those endpoints having better channel quality at a particular remote transceiver 320. Depending on the embodiment, there may be at least three components used to determine channel response: path loss, shadowing, and multipath. In contrast with shadowing and multipath effects (which are often random processes) path loss is the most dominant component in the channel response. Path loss may be a function of the distance between an endpoint and a remote transceiver. The closer an endpoint is to a particular remote transceiver, the higher the channel gain is between the endpoint and the remote transceiver. In a distributed antenna system, the varying distances between an endpoint and each remote transceiver 320 may result in varying path losses and channel gains between remote transceivers 320 and a particular endpoint.

In particular embodiments, the closer an endpoint is to a remote transceiver, the greater the power that will be allocated to the subcarriers associated with the endpoint. Conversely, the farther an endpoint is from a remote transceiver, the less power that will be allocated to subcarriers associated with the endpoint. This may allow each remote transceiver 320 to more efficiently use their available transmission power. The non-uniform power distribution to different subcarriers could enhance the signal to interference-plus-noise ratio (SINR) at the endpoint by increasing the received signal strength from the closer remote transceivers 320 while the loss of signal strength due to the reduced power from a more distant remote transceiver may be insignificant.

In particular embodiments, remote transceivers 320d, 320e, and 320g may measure the average received power of the subcarriers allocated to the endpoints coupled thereto. This information may then be delivered to base station 310c over a CPRI control channel via wired connections 330d, 330e, and 330g. Base station 310c may use the measured uplink power to approximate the downlink channel response between remote transceiver 320d, 320e, and 320g and the respective endpoints. This estimation may be used by base station 310c to determine the power distribution which base station 310 may then send to remote transceivers 320 using the CPRI control channel via wired connections 330d, 330e, and 330g.

In some embodiments, remote transceivers 320d, 320e, and 320g may send their own respective I/Q data along with I/Q data received from the upstream remote transceiver. Base station 310c may use the individual I/Q samples to estimate the received downlink power at the endpoint (e.g., it may be proportional to the determined uplink power). Using this estimated power, base station 310c may determine and apply an amount of amplification or attenuation to the download signal. This may be done without adjusting the phase of the download signal. The amplified data may then be sent to remote transceivers 320d, 320e, and 320g as individual I/Q data via wired connections 330d, 330e, and 330g.

In certain embodiments, once the subcarriers have been assigned, as discussed above, base station 310c may use the measured uplink power received from remote transceivers 320 to redistribute the downlink power to maximize system capacity. Depending on the embodiment and/or scenario, base station 310c could use any of a variety of strategies to apply power distribution. For example, base station 310c may use a strategy similar to maximum ratio combination (MRC). In this scenario, the allocated downlink power of a subcarrier at a particular remote transceiver (e.g., remote transceiver 320g) is made to be proportional to the uplink channel gain of the same subcarrier measured at the same particular remote transceiver (e.g., remote transceiver 320f). As another example, base station 310c may maximize system capacity by solving an optimization problem, such as:

$$\max \sum_{i=1}^{I} \sum_{u=1}^{N_{UE}} S_u \cdot \ln \left( 1 + \frac{\sum_{r=1}^{N_H} \frac{P_{r,u}^{UL}}{N_T} \cdot G_{r,u}^i}{\sum_{j=1}^{N_I} \frac{P_{j,u}^{UL}}{N_T} \cdot G_{j,u}^i + \sigma_n^2} \right)$$

$$s.t. \sum_{u=1}^{N_{UE}} G_{r,u}^i \cdot S_u \leq N \quad \forall \, i = 1, \ldots, I \text{ and } r = 1, \ldots, N_H.$$

In the above optimization formulation: (1) $S_u$ may represent the number of subcarriers allocated to the u-th end point; (2) $G_{r,u}$ ($=g_{r,u}^2$) may represent the square of the common power amplification factor at the r-th remote transceiver for all the subcarriers allocated to the u-th end point; (3) $P_{r,u}^{UL}$ may represent the average of the received uplink power of a subcarrier allocated to the u-th end point at the r-th remote transceiver; (4) c may represent a constant used to calibrate the differences between the transmitting and receiving antenna gains of downlink and uplink connections; (5) $N_T$ may represent the number of the transmitting antennas at each remote transceiver; (6) $N_R$ may represent the number of the remote transceivers controlled by a base station in a cell; (7) $N_{MS}$ may represent the number of end points that are scheduled in one transmission timing interval (TTI); (8) $\sigma_n^2$ may represent the variance of the noise power per subcarrier; (9) N may represent the number of points of FFT (Fast Fourier Transform) in a channel, which may be the same as the number of subcarriers in a channel; and (10) the term of the log function, ln( ) may represent the average estimated per subcarrier capacity at the u-th end point. It may be the case that the symbols in the formulation above represent mostly given parameters, with $G_{r,u}$ (r=1, . . . , $N_R$, and u=1, . . . , $N_{MS}$) being the variables in the formulation.

The objective function of the above formulation may be to maximize the overall system capacity. The system capacity may be based on the sum of the estimated capacity of, for example, all the end points connected to base station 310c or all the endpoints connected to all base stations 310. The first set of constraint functions may limit the total transmission power at each remote transceiver 320 to be less than or equal to a maximum transmission power, $P_T$. The constraint functions are derived from the following inequality:

$$\Sigma_{k=1}^{N} G_{r,k} \cdot P_{r,k}^{TX} \leq P_T \forall r=1, \ldots, N_R$$

where $P_{r,k}^{TX}$ is the power assigned to the k-th subcarrier of the r-th endpoint before the power amplification operation. Because, prior to the power amplification operation, all the subcarriers have equal power, $P_{r,k}^{TX}$ may be presented as $P_T/N$. Moreover, in certain embodiments, the power amplification gains for different subcarriers allocated to the same end point may be set to be the same. This may allow the inequality to be simplified to the constraint functions in the optimization problem. The second set of constraint functions may ensure the positive or zero power amplification gains computed from the optimization problem.

Once base station 310c has determined how to allocate the downlink power for the various subcarriers at remote transceivers 320d, 320e, and 320g, the power distribution may be applied either at base station 310c or at remote transceivers 320d, 320e, and 320g. For example, in some embodiments, base station 310c may generate I/Q data for each remote transceiver 320 that includes the core data modified by the power distribution (this may be done in the frequency domain before base station 310c performs Inverse Discrete Fourier Transform (IDFT) operations). This may scale the data of frequency domain (before IDFT) up or down proportionally such that the total power of remote transceivers 320d, 320e, and 320g do not exceed their respective capabilities.

In some embodiments, base station 310c may receive a combined uplink signal from remote transceivers 320d, 320e, and 320g. For example, remote transceiver 320e may send its received uplink signal to remote transceiver 320g. Remote transceiver 320g may combine its own received uplink signal with the uplink signal from remote transceiver 320e. The combined uplink signal may then be sent to remote transceiver 320d for remote transceiver 320d to add its received uplink signal. The combined uplink signal from all three remote transceivers is then sent to base station 310c. Accordingly, base station 310c may only receive one combined uplink I/Q sample and not individual I/Q samples from remote transceivers 320d, 320e, and 320g.

In certain embodiments, base station 310c may enhance uplink capacity via MRC. This may be achieved, in part, by determining the received signal power of the subcarriers allocated to each endpoint. Base station 310c may further use MRC in processing each I/Q data sample sent from remote transceivers 320d, 320e, and 320g. This may improve the array gain associated with the multiple receiving entities of remote transceivers 320d, 320e, and 320g.

In particular embodiments, base station 310c may apply the power distribution to the core data, $g_r(k)=\sqrt{G_r(k)}$, before Inverse Fast Fourier Transform (IFFT) is applied. Both power amplification and IFFT may be done locally at base station 310c. This may result in base station 310c sending different I/Q data to remote transceivers 320d, 320e, and 320g. This may increase the data rate of the CPRI link. However, because base station 310c is sending different I/Q data that is specific to each remote transceiver 320, it may be possible to use standard remote transceivers without having to modify them to be able to make power adjustments based on a power distribution from base station 310c. In particular embodiments, the MRC, power amplification determination, FFTs (to process I/Q samples received from remote transceivers), and the IFFTs (to process I/Q samples to be sent to remote transceivers), may be performed by discrete modules designed specifically for each respective task. In some embodiments, one or more of these features may be performed by a combination of one or more of, for example, processor 211, memory 213, storage 215, bus 212 and interface 217.

In particular embodiments, remote transceivers 320d, 320e, and 320g may apply the power distribution and perform IFFT locally. This may allow base station 310c to send the same (frequency-domain) data to remote transceivers 320d, 320e, and 320g. This may reduce the data rate needed for the CPRI link. In certain embodiments, in addition to the frequency domain I/Q data, base station 310c may also send the downlink scheduling information (e.g., the set of subchannels/subcarriers assigned to each endpoint in the transmission time interval (TTI)), and the power distribution for each endpoint. In particular embodiments, both pieces of information may be carried over CPRI control session. The amount of data for both power amplification gain and scheduling information is much less compared to I/Q data.

In particular embodiments, each remote transceiver 320 may combine its own I/Q data with the I/Q data it receives from an upstream remote transceiver 320. The combined I/Q data is then passed to the next remote transceiver 320 downstream (towards base station 310). Because base station 310c receives only a single set of I/Q data based on the combination of the I/Q data from remote transceivers 320d, 320e, and 320g, base station 310c may not be able to use the received I/Q data to determine the power amplification distribution. However, in certain embodiments, remote transceivers 320d, 320e, and 320g may compute the average received power from particular endpoints and send this information to base station 310c via a CPRI control signal. In some embodiments, computing the received power from an endpoint may include using the scheduling information from base station 310c. In particular embodiments, FFT operations may be performed at each remote transceiver 320d, 320e, and 320g thereby relieving base station 310c of the task of performing FFT. In some embodiments, remote transceivers 320d, 320e, and 320g may compute the average received power after FFT is conducted. In particular embodiments, remote transceivers 320d, 320e, and 320g may comprise one or more discrete hardware modules for computing the average received power and/or performing the FFT. In particular embodiments, these tasks may be performed by a combination of processor 221, memory 223, storage 225 and/or interface 227.

Thus far, several different embodiments and features have been presented. Particular embodiments may combine one or more of these features depending on operational needs and/or component limitations. This may allow for great adaptability of a distributed antenna system to the needs of various organizations and users. Some embodiments may include additional features.

Figure 4:
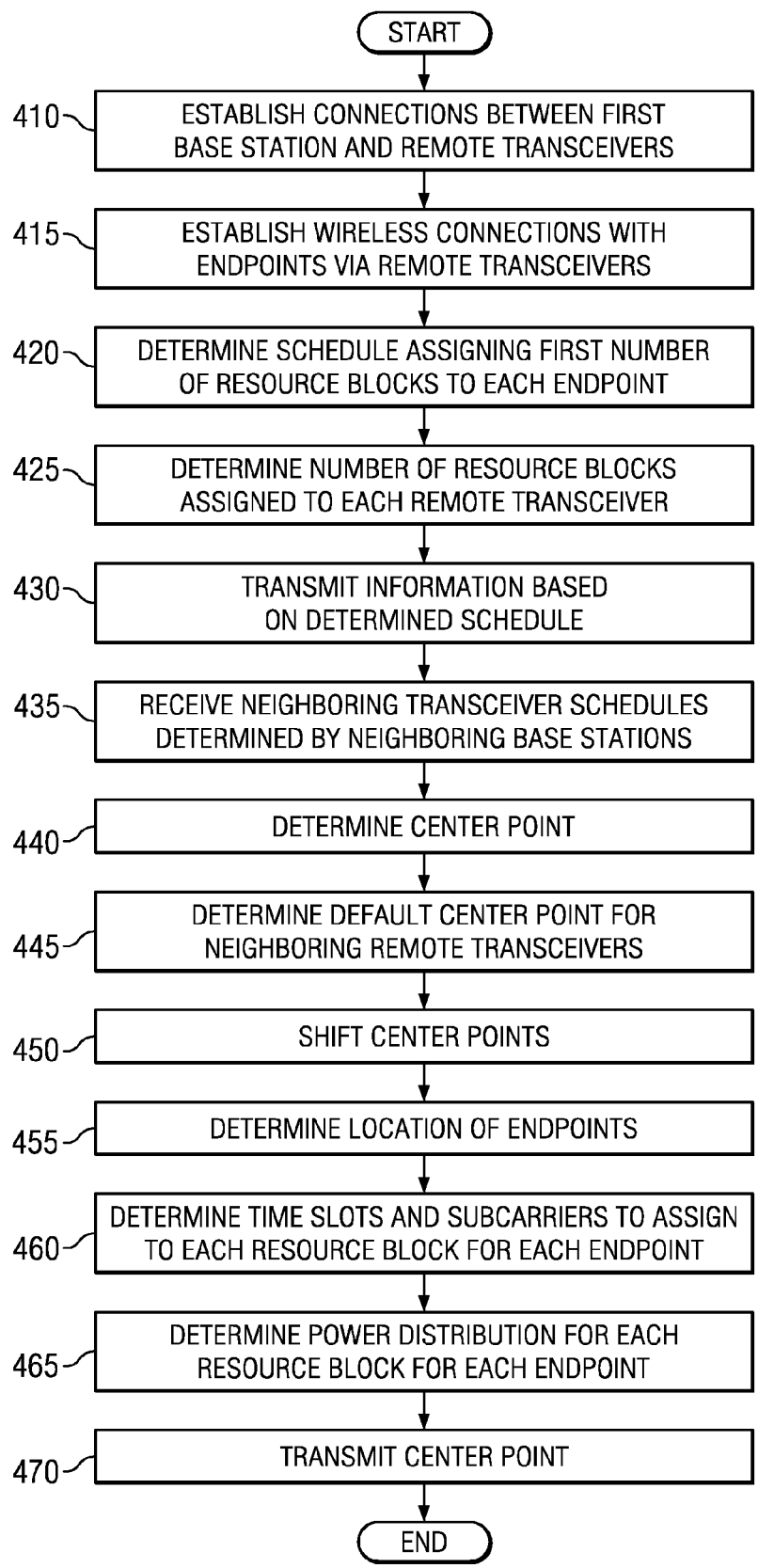
FIG. 4 illustrates a method for implementing coordinated resource allocations, in accordance with a particular embodiment.

FIG. 4 illustrates a method for implementing coordinated resource allocations, in accordance with a particular embodiment. For purposes of simplicity, the illustrated steps of the method for the depicted embodiment are described from the perspective of a base station. The base station is responsible for managing a plurality of remote transceivers in a wireless network of distributed antenna systems comprising other base stations managing other remote transceivers. The different distributed antenna systems of the wireless network may all use the same channel or group of channels, referred to in the method as the first channel, to establish wireless connections with one or more endpoints.

The method begins at step 410 where a connection between a base station and a plurality of remote transceivers is established. In particular embodiments, the connection may comprise individual wired connections between the base station and each remote transceiver. In some embodiments the connection between the base station and the plurality of remote transceivers may comprise a Common Public Radio Interface connection. Depending on the embodiment, the plurality of remote transceivers may be arranged in a cascaded topology, a star topology, a tree topology or a ring topology.

At step 415 a plurality of wireless connections are established with a plurality of endpoints. The wireless connections are established via one or more of the plurality of remote transceivers. As indicated above, the wireless connections may be within the first channel. The first channel may comprise a particular range of licensed frequencies. The first channel may also comprise frames having a known length of time. The licensed frequency of the first channel may be divided into subcarriers and the length of time of each frame may be divided into timeslots. In general, the combination of a subcarrier and a timeslot may be referred to as a resource block, and the particular subcarrier and timeslot of a particular resource block may be referred to as a location of the particular resource block. Thus, determining a location of a resource block may refer to determining the subcarrier and timeslot of the resource block.

While each endpoint, from its perspective, may have established a single wireless connection with a single base station, each endpoint may actually be sending and receiving communications from a number of remote transceivers. When an endpoint receives multiple wireless signals from multiple remote transceivers, it may perform various techniques for deriving the core data from the wireless signals. For example, in some embodiments an endpoint may combine two or more wireless signals from two or more remote transceivers (each wireless signal comprising the same core data).

At step 420, a schedule assigning a first number of resource blocks to each endpoint is determined. The greater the number of resource blocks assigned to a particular endpoint, the greater the data throughput for that respective endpoint. In certain embodiments, the number of resource blocks assigned to each endpoint may vary between the different remote transceivers connected to the base station. The number of resource blocks assigned to a particular endpoint may be based on a balance between providing the endpoint with a particular service level, while maintaining a particular service level for the remaining endpoints connected to the base station via the remote transceivers. This balancing act may be done based on one or more of a variety of policies such as resource fare policies or rate fare policies. In some embodiments, different endpoints may be provisioned differently than other endpoints. For example, if a customer has paid for a higher quality of service, the corresponding endpoint may receive a greater number of resource blocks than would be assigned if the customer had only paid for a standard or lower quality of service.

In certain embodiments, the base station may receive signal quality indications from which the base station may be able to determine the relative quality, strength, and/or efficiency of a wireless connection. This information may be used in determining the number of resource blocks to assign to a particular endpoint.

At step 425, the number of resource blocks assigned to each remote transceiver is determined. The number of resource blocks assigned to each remote transceiver may be determined based on the general location of the endpoints and the schedule determined at step 420. For purposes of the step 425, the general location may be less precise than, for example the sector location (e.g. determined at step 455). For example, the general location may identify the coverage area within which the respective endpoint is located. The general location of the endpoints may be used to determine which coverage areas of which remote transceivers the endpoints are within. Using the schedule, the base station may be able to determine the number of resource blocks that are assigned to each remote transceiver based on which endpoints are within the coverage area of which remote transceivers. The number of resource blocks assigned to each remote transceiver, when added together, will equal the total number of resource blocks available in the first channel. The number of resource blocks determined at step 420 and 425 may be determined without any scheduling information from neighboring base stations.

At step 430, information based on the determined schedule is transmitted to one or more neighboring base stations. The overhead associated with transmitting the information to neighboring base stations may be reduced by only sending the information to neighboring base stations with remote transceivers that directly border, or are adjacent to, the remote transceivers controlled by the transmitting base station. In certain embodiments, the transmitted information may comprise the number of resource blocks assigned to each remote transceiver, as determined at step 425.

At step 435, the base station may receive neighboring transceiver schedules determined by neighboring base stations. The neighboring transceiver schedule may comprise information indicative of the number of resource blocks that have been assigned to a particular remote transceiver. The received neighboring transceiver schedule may be received from the same neighboring base stations to which the current base station transmitted the information based on its determined schedule.

At step 440, one or more center points are determined. In particular embodiments, each center point may correspond to a center of the remote transceiver resource block assigned to each remote transceiver within the first channel. Each remote transceiver resource block may be based on the number of resource blocks assigned to the endpoints connected to the respective remote transceiver. For example, if the first channel comprises 24 resource blocks, and the resource blocks are assigned evenly between three remote transceivers (e.g., each remote transceiver is assigned 8 resource blocks), then the first center point, associated with the first remote transceiver, may be between the 4th and 5th resource block, the second center point, associated with the second remote transceiver, may be between the 12th and 13th resource block, and the third center point, associated with the third remote transceiver, may be between the 20th and 21st resource block.

At step 445, the neighboring center point for neighboring remote transceivers is determined. In some embodiments the neighboring center points may be determined based on the neighboring transceiver schedules. In particular embodiments, the neighboring center points for neighboring remote transceivers may be determined from the actual center points used by neighboring remote transceivers. For example, neighboring base stations may periodically transmit an average center point based on previous center points used for their remote transceiver resource blocks. The neighboring center point information may be received less frequently than the neighboring transceiver schedules. In some embodiments, the neighboring center points for neighboring remote transceivers may be determined from a combination of previously used center points and the number of resource blocks assigned to each neighboring remote transceiver as indicated in the received neighboring transceiver schedules.

At step 450, the center points of the local remote transceiver blocks are shifted. The amount of shift may be based on a combination of the locally determined center point (step 440) along with the determined neighbor center point for neighboring remote transceivers (step 445). Shifting the center points may help to reduce the amount of overlapping resource blocks used between neighboring remote transceivers. This may reduce the amount of interference created between neighboring remote transceivers.

At step 455, the location of each endpoint is determined. The location of each endpoint may be determined through any of a variety of different means. For example, endpoint locations may be determined through GPS, triangulation, simple lexical comparison, pre-measurement, or a combination of the above. Simple lexical comparison may determine the location of a particular endpoint by comparing the signal strength from the particular endpoint at each of the remote transceivers. A comparison of the relative signal strength may be used by the base station to determine a sector within the coverage area of a particular remote transceiver within which the endpoint is located.

At step 460, timeslots and subcarriers to be assigned to each resource block for each endpoint are determined. The assigned subcarrier and timeslot for a resource block may generally be referred to as the location of the resource block. In certain embodiments, the location of the resource blocks may be based in part on the location of an endpoint. For example, if an endpoint is determined to be located within a sector that is adjacent to a neighboring remote transceiver, then the base station may attempt to assign resource blocks that do not overlap with the resource blocks used by the neighboring remote transceiver. The location of the resource blocks for a particular endpoint at a particular remote transceiver may be based on the shifted center point of the respective local RT block determined at step 450.

In some embodiments, the resource blocks may be assigned based on a difference in signal levels determined using an equation, such as, $d_{12}=10*\log(P_{RT1}/P_{RT2})$; where $d_{12}$ is the difference in signal levels between a first remote transceiver and a second remote transceiver; $P_{RT1}$ is the signal level at the first remote transceiver and $P_{RT2}$ is the signal level at the second remote transceiver. Once the difference in signal levels has been determined for each relevant combination of remote transceivers for a particular endpoint, the difference in signal levels for the endpoint may be summed together and used to determine the location of the resource blocks assigned to that endpoint. For example, the sum may be used to sort the endpoint in an ordered list comprising the plurality of endpoints. The list may be sorted such that the first endpoint in the list has the highest total difference in signal levels and the last endpoint in the list has the lowest total. Resource blocks may then be allocated to the endpoints, the resource blocks closest to the shifted center point (step 450) may be allocated to the endpoint at the top of the sorted list, and each endpoint further down the list may be allocated resource blocks that are progressively farther away from the shifted center point. Whether the allocated resource blocks are to the "left" or the "right" of the shifted center point may depend on the sector location of the corresponding endpoint.

At step 465, a power distribution for each resource block for each endpoint is determined. The power distribution may be such that different resource blocks for different endpoints at different remote transceivers are assigned different transmission powers based on the distance between the endpoint and the remote transceiver. The power distribution may be based, at least in part, on the signal quality between the remote transceivers and the endpoint. The power distribution may indicate the amount of amplification each remote transceiver is to use when transmitting wireless communications to each of the endpoints. In certain embodiments, the better (e.g., stronger, clearer, more efficient) a wireless signal is between a remote transceiver and an endpoint, the greater the amount of power the remote transceiver will use to communicate with the endpoint; conversely the worse a wireless signal is, the less power the remote transceiver will use to communicate with the endpoint.

In certain embodiments, once the base station has made its determination for how each remote transceiver is to allocate power among the plurality of endpoints, the base station may apply the power distribution to the data before it is sent to the remote transceivers for transmission to the endpoint. In some embodiments the power distribution may be communicated to the remote transceivers and the remote transceivers may apply the amplification to the data.

At step 470, the center point, after the shift determined at step 450, is transmitted to neighboring base stations. The shifted center point may be transmitted on a much less frequent basis than the frequency with which the information based on the schedule is transmitted at step 430. For example, steps 420 through 465 may be repeated several times between each execution of step 470. The shifted center point may be transmitted so that neighboring base stations may be able to estimate the position of the center point of the local base station. In some instances, the transmitted shifted center point may be an average of multiple shifted center points.

Some of the steps illustrated in FIG. 4 may be combined, modified or deleted where appropriate, and additional steps may also be added to the flowchart. Additionally, steps may be performed in any suitable order without departing from the scope of particular embodiments.

While various implementations and features are discussed with respect to multiple embodiments, it should be understood that such implementations and features may be combined in various embodiments. For example, features and functionality discussed with respect to a particular figure, such as FIG. 2, may be used in connection with features and functionality discussed with respect to another such figure, such as FIG. 1 or FIG. 3, according to operational needs or desires.

Although particular embodiments have been described in detail, it should be understood that various other changes, substitutions, and alterations may be made hereto without departing from the spirit and scope of particular embodiments. For example, although an embodiment has been described with reference to a number of elements included within base station 210 such as a processor, memory, storage, an interface, and a bus, these elements may be combined, rearranged or positioned in order to accommodate particular wireless architectures or needs. In addition, any of these elements may be provided as separate external components to base station 210 or each other where appropriate. Particular embodiments contemplate great flexibility in the arrangement of these elements as well as their internal components.

Numerous other changes, substitutions, variations, alterations and modifications may be ascertained by those skilled in the art and it is intended that particular embodiments encompass all such changes, substitutions, variations, alterations and modifications as falling within the spirit and scope of the appended claims.

What is claimed is:

1. A method for assigning resources, comprising:
    establishing one or more connections between a first base station and one or more remote transceivers;
    establishing one or more wireless connections with one or more endpoints via at least one of the one or more remote transceivers, the one or more wireless connections using a first channel;
    determining a schedule assigning a first number of resource blocks to each endpoint of the one or more endpoints;
    receiving one or more neighboring transceiver schedules determined by one or more neighboring base stations, each neighboring transceiver schedule indicating a different number of resource blocks assigned to each neighboring remote transceiver connected to the respective neighboring base station;

determining one or more time slots and one or more subcarriers within the first channel to assign to each resource block for each endpoint of the one or more endpoints based on the schedule, the one or more neighboring transceiver schedules, and a location of each endpoint;

determining a power distribution for each resource block for each endpoint of the one or more endpoints; and coordinating the determining one or more timeslots and one or more subcarriers within the first channel and the determining a power distribution for each resource block to optimize capacity among the first base station and the one or more neighboring base stations.

2. The method of claim 1, further comprising transmitting to the one or more neighboring base stations information based on the determined schedule assigning a first number of resource blocks to each endpoint of the one or more endpoints.

3. The method of claim 1, further comprising:
determining a number of resource blocks assigned to one or more remote transceiver blocks based on the schedule, each remote transceiver block associated with a different one of the one or more remote transceivers; and
determining a center point within the first channel for each of the one or more remote transceiver blocks based on the number of resource blocks assigned to each remote transceiver block.

4. The method of claim 3, further comprising determining a neighbor center point within the first channel for each neighboring remote transceiver for each of the one or more neighboring base stations based on the received one or more neighboring transceiver schedules.

5. The method of claim 4, further comprising shifting each center point within the first channel.

6. The method of claim 3, further comprising transmitting to the one or more neighboring base stations the determined center point.

7. The method of claim 1:
further comprising determining a location of the one or more endpoints; and
wherein determining one or more time slots and one or more subcarriers within the first channel to assign to each resource block comprises determining one or more time slots and one or more subcarriers within the first channel to assign to each resource block to avoid overlapping resource blocks being assigned to endpoints located within a coverage area of adjacent remote transceivers.

8. A non-transitory computer readable medium comprising code, that when executed by a processor, is configured to:
establish one or more connections between a first base station and one or more remote transceivers;
establish one or more wireless connections with one or more endpoints via at least one of the one or more remote transceivers, the one or more wireless connections using a first channel;
determine a schedule assigning a first number of resource blocks to each endpoint of the one or more endpoints;
receive one or more neighboring transceiver schedules determined by one or more neighboring base stations, each neighboring transceiver schedule indicating a different number of resource blocks assigned to each neighboring remote transceiver connected to the respective neighboring base station;

determine one or more time slots and one or more subcarriers within the first channel to assign to each resource block for each endpoint of the one or more endpoints based on the schedule, the one or more neighboring transceiver schedules, and a location of each endpoint;

determine a power distribution for each resource block for each endpoint of the one or more endpoints; and coordinate the determination of one or more timeslots and one or more subcarriers within the first channel and the determination of a power distribution for each resource block to optimize capacity among the first base station and the one or more neighboring base stations.

9. The medium of claim 8, wherein the logic is further configured to transmit to the one or more neighboring base stations information based on the determined schedule assigning a first number of resource blocks to each endpoint of the one or more endpoints.

10. The medium of claim 8, wherein the logic is further configured to:
determine a number of resource blocks assigned to one or more remote transceiver blocks based on the schedule, each remote transceiver block associated with a different one of the one or more remote transceivers; and
determine a center point within the first channel for each of the one or more remote transceiver blocks based on the number of resource blocks assigned to each remote transceiver block.

11. The medium of claim 10, wherein the logic is further configured to determine a neighbor center point within the first channel for each neighboring remote transceiver for each of the one or more neighboring base stations based on the received one or more neighboring transceiver schedules.

12. The medium of claim 11, wherein the logic is further configured to shift each center point within the first channel.

13. The medium of claim 10, wherein the logic is further configured to transmit to the one or more neighboring base stations the determined center point.

14. The medium of claim 8:
wherein the logic is further configured to determine a location of the one or more endpoints; and
wherein the logic configured to determine one or more time slots and one or more subcarriers within the first channel to assign to each resource block comprises logic configured to determine one or more time slots and one or more subcarriers within the first channel to assign to each resource block to avoid overlapping resource blocks being assigned to endpoints located within a coverage area of adjacent remote transceivers.

15. An apparatus for assigning resources, comprising:
an interface configured to:
establish one or more connections between a first base station and one or more remote transceivers;
establish one or more wireless connections with one or more endpoints via at least one of the one or more remote transceivers, the one or more wireless connections using a first channel; and
a processor coupled to the interface and configured to determine a schedule assigning a first number of resource blocks to each endpoint of the one or more endpoints;
wherein the interface is further configured to receive one or more neighboring transceiver schedules determined by one or more neighboring base stations, each neighboring transceiver schedule indicating a different number of resource blocks assigned to each neighboring remote transceiver connected to the respective, neighboring base station; and wherein the processor is further configured to:
    determine one or more time slots and one or more subcarriers within the first channel to assign to each resource block for each endpoint of the one or more endpoints based on the schedule, the one or more neighboring transceiver schedules, and a location of each endpoint;
    determine a power distribution for each resource block for each endpoint of the one or more endpoints; and
    coordinate the determination of one or more timeslots and one or more subcarriers within the first channel and the determination of a power distribution for each resource block to optimize capacity among the first base station and the one or more neighboring base stations.

16. The apparatus of claim 15, wherein the interface is further configured to transmit to the one or more neighboring base stations information based on the determined schedule assigning a first number of resource blocks to each endpoint of the one or more endpoints.

17. The apparatus of claim 15, wherein the processor is further configured to:
    determine a number of resource blocks assigned to one or more remote transceiver blocks based on the schedule, each remote transceiver block associated with a different one of the one or more remote transceivers; and
    determine a center point within the first channel for each of the one or more remote transceiver blocks based on the number of resource blocks assigned to each remote transceiver block.

18. The apparatus of claim 17, wherein the processor is further configured to determine a neighbor center point within the first channel for each neighboring remote transceiver for each of the one or more neighboring base stations based on the received one or more neighboring transceiver schedules.

19. The apparatus of claim 18, wherein the processor is further configured to shift each center point within the first channel.

20. The apparatus of claim 17, wherein the interface is further configured to transmit to the one or more neighboring base stations the determined center point.

21. The apparatus of claim 15:
    wherein the processor is further configured to determine a location of the one or more endpoints; and
    wherein the processor configured to determine one or more time slots and one or more subcarriers within the first channel to assign to each resource block comprises a processor configured determine one or more time slots and one or more subcarriers within the first channel to assign to each resource block to avoid overlapping resource blocks being assigned to endpoints located within a coverage area of adjacent remote transceivers.

* * * * *